June 15, 1937.                A. M. KREMENTZ                2,083,999
                              OPHTHALMIC DEVICE
                            Filed Oct. 14, 1936
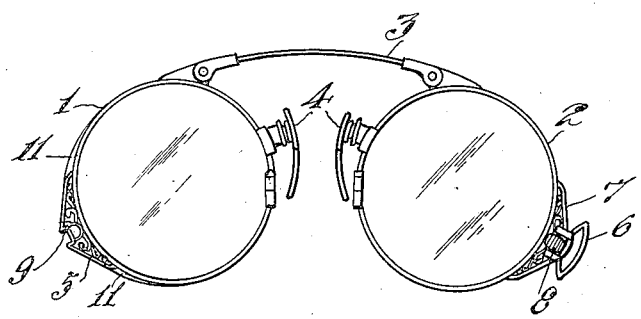
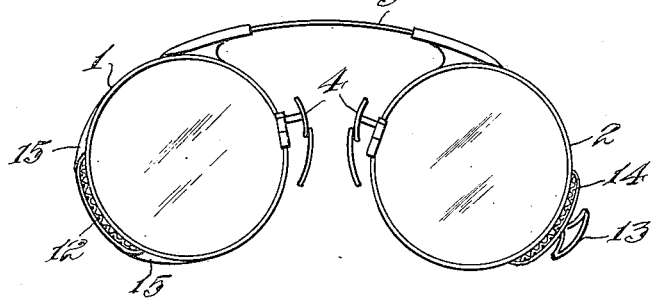
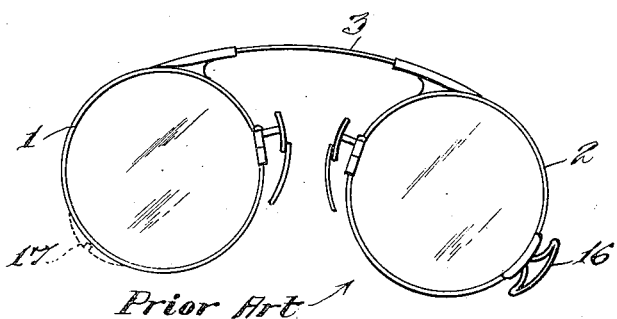
Prior Art
INVENTOR
Albert M. Krementz
BY Frdk C Fischer
ATTORNEY Patented June 15, 1937

2,083,999

UNITED STATES PATENT OFFICE 2,083,999

OPHTHALMIC DEVICE

Albert M. Krementz, Maplewood Township, Essex County, N. J., assignor to Frank Krementz Company, Newark, N. J., a corporation of New Jersey Application October 14, 1936, Serial No. 105,572

2 Claims. (Cl. 88—44)

In order that eyeglasses may have their intended beneficial effect, it is highly important that they be worn in exact alignment with the eyes. The lenses are so arranged within their rims that if the eyeglasses are even slightly disaligned with the eyes of the wearer, serious harm to the wearer's eyes may result.

Eyeglasses of the type provided with temples are naturally balanced and maintained in correct alignment with the eyes.

Eyeglasses which do not have temples, but which moreover have a handle secured to one lens rim, are naturally unbalanced by the weight of the handle. Such eyeglasses tend to become disaligned with the eyes of the wearer, with the harmful results pointed out above. Frequently, attempts are made to force the rims into correct alignment; such attempts distort the entire eyeglass frame.

An object of my invention is to provide an eyeglass frame of the type which has a handle member and base secured to one rim with means on the other rim to balance the eyeglasses.

Another object of my invention is to provide a balancing member secured to the rim of the frame which is diametrically opposite to the rim carrying the handle member.

These and other advantageous objects which will later appear, are accomplished by the simple and practical construction and arrangement of parts hereinafter described and exhibited in the accompanying drawing, forming part hereof, and in which:

Fig. 1 is an elevational view of an eyeglass frame embodying my invention,

Fig. 2 is a similar view of a frame embodying another form of my invention, and

Fig. 3 is a similar view of a frame which does not embody my invention.

This invention relates to eyeglasses preferably of the folding Oxford type. Fig. 3 of the drawing illustrates an "Oxford" folding eyeglass frame comprising the lens rims 1 and 2 connected by a bridge spring 3. It has been common heretofore to provide such a frame with a handle 16 secured directly to the lens rim 2 resulting in what became known in the industry as an "unbalanced frame". It is common to provide the lens rim 2 with a latch nosing, such as the latch nosing 8 shown in Fig. 1, where the handle was built around or formed integral with the latch nosing and the lens rim 1 was provided with a recessed member 17 to receive the latch nosing when the frame was folded. This construction resulted in an "unbalanced frame".

It has been found desirable to secure the handle 13 to a base 14, the base being secured to the lens rim of Fig. 2 in any desired or convenient manner. In this form the frame is decidedly unbalanced. Likewise, where the lens rim 2 is provided with a latch nosing 8 (Fig. 1) having a handle 6 built around or formed integral with said nosing, and the latch nosing 8 is mounted on a base 7, the base being secured to the lens rim 2 in any desired or convenient manner, there is also produced a decidedly unbalanced frame.

The object of my invention is to provide the lens rim 1 with a member which will serve to at least substantially balance the frame. This balancing member may be formed of the same blank as the base on the rim 2; where the frame, as in Fig. 1, has a latch nosing, the balancing member 5 may be recessed at 9 to receive the latch nosing when the frame is folded. Where the lens rim 2 is not provided with latching means, as in Fig. 2, the balancing member 12 is not recessed.

By this means the frame is substantially balanced. Should it be desired to perfectly balance the frame, the balancing members may be enlarged, as indicated at 11—11 in Fig. 1 and at 15—15 in Fig. 2 or the balancing members may be made of a heavier metal.

The balancing members are preferably of the same configuration as the base members so that, when the frames are closed, the handle members will protrude above the balancing members and bases, facilitating the easy manipulation of the eyeglasses. This is an important feature of my invention.

The foregoing disclosure is to be regarded as descriptive and illustrative only, and not as restrictive or limitative of the invention, of which many embodiments may be constructed including many modifications, without departing from the general scope herein indicated and denoted in the appended claims.

Having thus described my invention, what I claim as new and desire to secure by Letters Patent, is:

1. A frame for folding eyeglasses, comprising a pair of lens rims, connected by a spring bridge, a base attached to one of the rims, a handle having a latching element mounted on said base, a balancing member secured to the outer edge of the other rim and having substantially the same shape as the base, said balancing member having substantially the same weight as the base and handle and latching element and being located at a distance from the center of the spring bridge equal to the distance of the base and handle from said point, said balancing member being recessed to receive the latching member when the frame is folded.

2. A frame for folding eyeglasses, comprising a pair of lens rims connected by a bridge, a base attached to one of the rims, a handle having a latching element mounted on said base, a balancing member secured to the outer edge of the other rim, said balancing member having substantially the same shape and weight as the base and handle and latching element and being located at a distance from the center of the bridge equal to the distance of the base and handle from said point, said balancing member having means to cooperate with the latching member when the frame is folded.

ALBERT M. KREMENTZ.